F. W. EDWARDS.
SIGHT FEED FOR LUBRICATORS.
APPLICATION FILED AUG. 24, 1908.
952,515.
Patented Mar. 22, 1910.
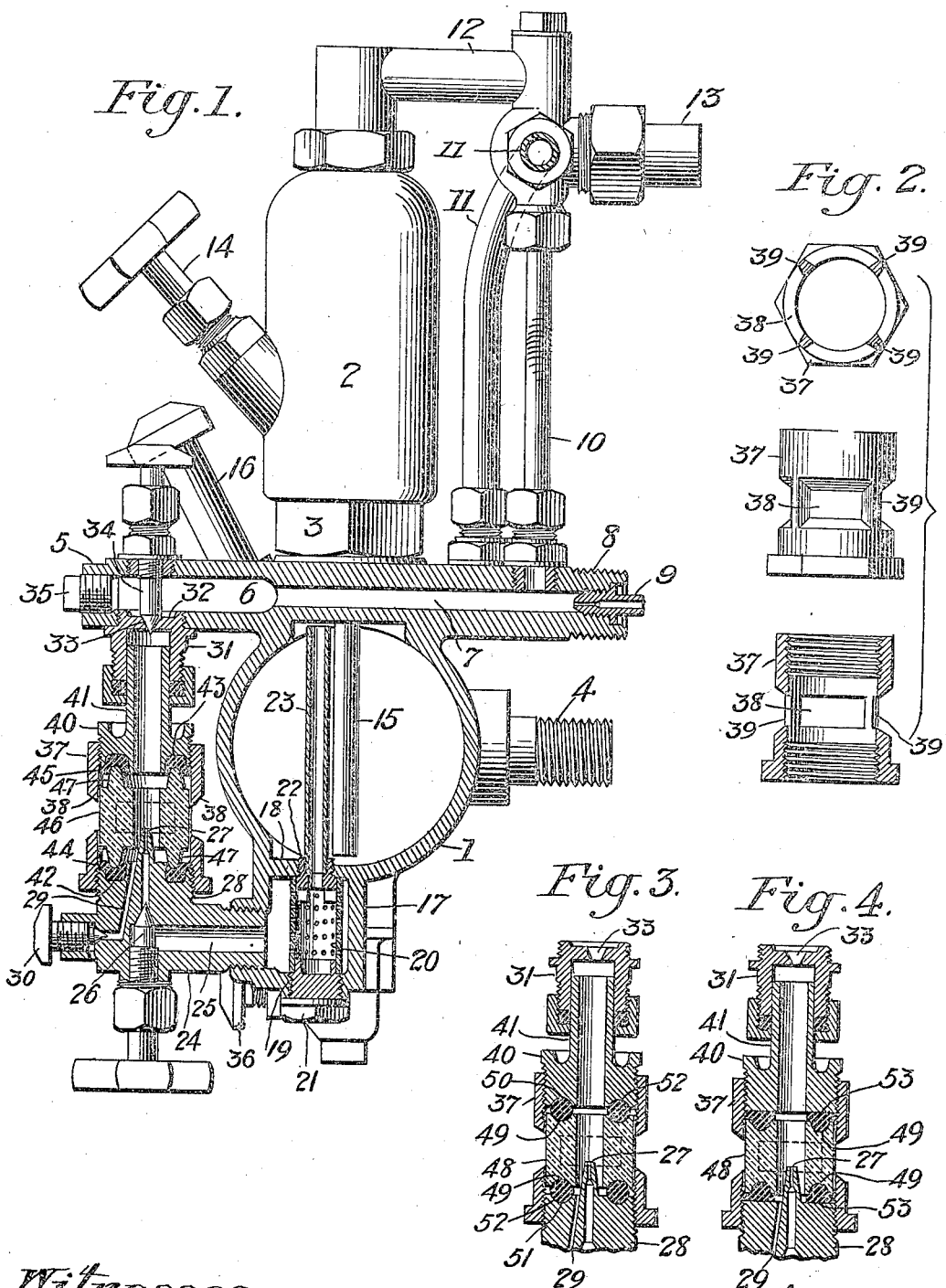
Witnesses:
O. A. Edelin
Lillie M. Perry
Inventor:
Frank W. Edwards
by Wm. H. Finckel Atty.

UNITED STATES PATENT OFFICE.

FRANK W. EDWARDS, OF LOGANSPORT, INDIANA, ASSIGNOR TO THE CHICAGO LUBRICATOR COMPANY, OF CHICAGO, ILLINOIS, A CORPORATION OF ILLINOIS.

SIGHT-FEED FOR LUBRICATORS.

952,515.  Specification of Letters Patent.  Patented Mar. 22, 1910.

Application filed August 24, 1908. Serial No. 450,094.

*To all whom it may concern:*

Be it known that I, FRANK W. EDWARDS, a citizen of the United States, residing at Logansport, in the county of Cass and State of Indiana, have invented a certain new and useful Improvement in Sight-Feeds for Lubricators, of which the following is a full, clear, and exact description.

An essential requirement in a sight-feed lubricator is that it shall permit such observations of the feed that the operator may determine whether the lubricator is feeding with the required regularity. To this end sight-feed lubricators have always been constructed with sight-feed chambers through which the oil passes drop by drop, the whole or some portion of the walls of these chambers being of glass. These glasses are usually called "observation glasses" and have been of two general types. In one of these types the glass is in the form of a tube of uniform diameter and having walls of uniform thickness, the oil passing through the tube. It is highly important that the sight-feed chamber should be so located as to be readily observable from various points of view about the lubricator, and more important still that its interior should be subjected to light and that its interior should be illuminated by the light coming from various directions and passing through the transparent walls of the chamber. This facility of observation has been secured in the old well-known tubular glass which is held at its ends in supporting arms usually provided with packing. While this form of glass was ideal in that it was so placed that the feed of oil could be observed from various positions, and also in that it permitted the light to enter the chamber from various directions thus affording perfect illumination on the lubricator, yet it has certain inherent and radical defects which have never been overcome and for which heretofore no remedy has been proposed. These defects arose from the frequent breakage due to the fragile character of the tube itself, no such glass having been heretofore constructed of sufficient strength to withstand the internal steam pressures and the strains due to the variation of temperature and the getting out of line of the mountings. These glasses frequently broke, thus putting the lubricator out of service, and the danger from flying particles of glass was so serious as to cause the use of wire guards around the glasses, thus adding to the expense and interfering with ready observation. The other type of glasses is known as the bull's-eye. These glasses are invariably mounted in pockets, usually of metal, and fitted into the side walls of the sight-feed chambers. These glasses are solid and usually of greater axial length than diameter. The pockets or chambers containing the glasses are usually arranged in pairs, being placed in line with each other on opposite sides of the sight-feed chamber. These glasses largely overcome the liability of breakage, but they do not afford ready observation from different points, having, in fact, only small areas exposed to the light and being for the most part surrounded by solid walls; and they cannot always be so placed as to permit the light to enter through both glasses or from opposite sides of the chamber. Further these glasses are so thick and their exposed areas so limited that they do not afford good illumination, and with turbid water the feed of the oil cannot be observed readily. These objections are so pronounced that it is generally recognized that the bull's eye type of glass affords less facility for correct observation of the feed of the oil than the tubular glass, but these bull's-eyes have been and are used because of their avoidance of the objections to tubular glasses above stated.

The object of my invention is to secure all of the advantages without the defects of both forms of glasses above mentioned and to insure complete illumination and perfect observation, together with necessary strength and safety.

The generic invention is illustrated and claimed in a concurrent case of even date herewith, Serial No. 460,096 and the present invention illustrates several species of that invention, other species being illustrated also in two other concurrent cases Serial Nos. 450,093 and 450,095.

The invention herein consists, principally, in a reinforced observation glass having a central longitudinal oil passage and a thick walled central portion, and ends provided with annular gasket-engaging portions arranged centrally between its oil passage and periphery and in the form of annular projections or grooves for coöperation with gaskets of suitable cross-section to coöperate with these projections or grooves in order to cushion the glass and secure it in a leaktight manner within a suitable packing-case.

In the accompanying drawings, illustrating the invention, in the several figures of which like parts are similarly designated, Figure 1 is a vertical section, some parts in elevation, of a preferred form of sight-feed condensation displacement lubricator, the section being drawn through the sight-feed for the air-pump lubricating connection, and showing one form of reinforced observation glass and its gaskets. Fig. 2 shows in horizontal cross-section, elevation, and longitudinal section one form of packing-case. Fig. 3 is a longitudinal section illustrating another form of reinforced observation glass and gaskets, and its packing-case. Fig. 4 is a longitudinal section illustrating another form of reinforced observation glass and gaskets, and its packing-case.

For illustration and without thereby limiting the invention, I have shown a horizontally arranged cylindrical oil-bowl 1, upon which is arranged a condenser 2, which may be cast with the oil-bowl or applied to it through the medium of a screwthreaded nipple on the bowl engaged by the nut-like end 3 of the condenser. The oil-bowl is provided with an integral attaching-lug 4. At the top of the oil-bowl and cast integral therewith are the upper feed-arms 5, as many in number as there are parts to be lubricated, and all of substantially the same construction as the one shown. This feed-arm has the internal passage 6 opening into the passage 7 of the oil pipe connection 8, which may have the choke-plug 9 in it. The passages described are supplied with steam through pipes 10 and 11, which lead, for example, to the air-pump and the two engine cylinders respectively. These pipes are attached to a casting 12 which is connected with the condenser and has a boiler connection 13, for supplying steam to the apparatus. The condenser has a valve 14 for controlling its outflow through pipe 15 into the oil-bowl, and the latter has a filling plug 16.

The oil-bowl has a pocket 17 integral with its bottom and separated from it by a partition 18. This pocket has a bottom opening 19 through which is inserted a cylindrical strainer 20 whose perforations are smaller than the bore of the oil feed-tip. This strainer is supported in the pocket by a cap nut 21 screwed into the opening 19 and by a nut 22 screwed in a hole in the partition 18, and this nut 22 also receives and supports the oil feed pipe 23 rising to near the top of the oil-bowl.

The lower feed-arm 24 is screwed into the pocket and has the feed passage 25 which is intersected by an oil feed valve 26 seated in the upper wall of the lower feed-arm in line with the feed tip 27, and the upper wall of said feed-arm is supplied with an integral hub 28 which surrounds the base of the feed-tip and forms with it a pocket which is drained by channel 29 and valve 30. The upper feed-arm 5 has an attached hub 31 provided with a partition 32 having a hole 33 in it, which forms a seat for the valve 34 which controls the inflow of steam and the outflow of oil. This feed-arm 5 is also provided with an end opening closed by a plug 35, which may be replaced by an auxiliary oil-cup should the feed become deranged.

The oil-bowl may be provided with a draining valve 36.

All of the parts so far described in detail may be of approved construction, and some of them form parts of the invention of the generic case before mentioned.

The packing-case has the sight openings 38 separated by strips 39 of the least possible thickness consistent with strength. The packing-nut 40 has the tubular extension 41 for coöperation with the upper feed-arm hub. The lower feed-arm hub has in it an annular groove 42 and the packing-nut has in it a similar groove 43, to receive the irregularly shaped gaskets 44 and 45 which are interposed between these parts and the ends of the observation glass. As shown in Fig. 1, this observation glass 46 has a longitudinal oil passage and annular end projections or flanges 47 of conoidal cross-section and the gaskets at top and bottom are designed to embrace these flanges. In this construction it is preferred to place the gaskets in the grooves made respectively in the bottom hub and inner side of the packing-nut, and in this case the surrounding metal holds the gaskets in contact with the adjacent surfaces of the glass. Moreover, this construction has the additional advantage that it does not require much compression of the gaskets to hold the pressure within the glass.

In Fig. 3 the glass 48 is cylindrical and of uniform diameter, but with its ends provided with grooves 49, and the bottom of the packing-nut has a similar groove 50, and the lower feed-arm hub has a similar groove 51, and in these grooves are placed the gaskets 52 of circular cross-section. In the construction of glass herein shown and also shown in Fig. 4, the glass is so thick that its edges may be grooved to receive the gaskets, and in both cases the glass has full strength throughout its entire length, and, consequently, the packing-nuts do not have to be so carefully adjusted when packing the glass. In both instances also the glass is perfectly alined.

In Fig. 4 the glass 48 is like that shown in Fig. 3, but the adjacent surfaces of the packing-nut and the hub are flat and between these flat surfaces are gaskets 53 having flat bases to fit against the adjacent flat portions of the packing-nut and hub and segmental projections which fit into the grooves of the glass.

The annular projections or grooves on the glass are arranged about midway between the longitudinal oil passages and the peripheries of the glasses.

The packing-case, packing-nut and the lower feed-arm hub constitute a container for the glass and its gaskets.

Variations in the construction of the packing-case and nut are possible within the scope of the invention, some instances of which are set forth in my cases referred to.

In all of these various constructions there are the essentials of the inclosing and protecting case with many openings for the passage of the light and for inspection of the feed; the strong, reinforced glasses, and the gaskets interposed between the glass and the metal to effect steam, oil, and water-tight joints; and there are also present, equally in each of them, facilities for dismembering the parts for repair and other purposes. The gaskets form cushions between the glass and the metal and thus serve to protect the glass from being chipped or crushed when the metal expands, and they are of sufficient elasticity to yield under contraction and maintain tight joints. In all of the various forms of these reinforced observation glasses special attention has been given to illumination and to their packing in metallic cases or containers in order to insure a perfect seal of the glass on the feed-arms and the packing-nuts and at the same time permit free expansion in any direction and yet retain tight joints.

In all of the various forms of glasses herein described the gasket-engaging portions are arranged concentrically with relation to the glasses and at their ends, as distinguished from beveling or coning the glasses externally at their ends, and the result is that the pressure on the gaskets is transmitted in a right line with the length of the glasses, without lateral or inward pressure, and hence there is no tendency to crush in the ends of the glasses.

What I claim is:—

1. A sight-feed for lubricators, including a reinforced observation-glass having a thick walled central portion, a longitudinal oil passage, and ends formed with gasket-engaging portions of annular form and arranged between the oil passage and the periphery concentrically with the glass and adapted to receive only endwise thrust from the gaskets.

2. A sight-feed for lubricators, including a reinforced observation-glass having a thick walled central portion, a longitudinal oil passage, and ends formed with gasket-engaging portions of annular form and arranged between the oil passage and the periphery concentrically with the glass and adapted to receive only endwise thrust from the gaskets, combined with gaskets whose cross-section adapts them to be applied to said ends so as to transmit the thrust in a right line with the length of said glass.

3. A sight-feed for lubricators, including a reinforced observation glass having a thick walled central portion, a longitudinal oil passage, and ends grooved between the oil passage and the periphery.

4. A sight-feed for lubricators, including a reinforced observation glass having a thick walled central portion, a longitudinal oil passage, and ends grooved between the oil passage and the periphery, combined with gaskets of a cross-section complemental to the grooved ends.

5. A sight-feed for lubricators, including a reinforced observation glass having a thick walled central portion, a longitudinal oil passage, and ends provided with annular grooves.

6. A sight-feed for lubricators, including a reinforced observation glass having a thick walled central portion, a longitudinal oil passage, and ends provided with annular grooves, combined with gaskets adapted to enter said annular grooves.

7. A sight-feed for lubricators, including a reinforced observation-glass having a thick walled central portion, a longitudinal oil passage and ends formed with annular gasket-engaging portions arranged between the oil passage and the periphery concentrically with the glass and adapted to receive only endwise thrust from the gaskets, combined with gaskets whose cross-section adapts them to be applied to said ends so as to transmit the thrust in a right line with the length of said glass, a packing-case within which the glass and the gaskets are confined, and means to support the packing-case.

8. A sight-feed for lubricators, including a reinforced observation glass having a thick walled central portion, a longitudinal oil passage, and ends provided with annular grooves, combined with gaskets having one side shaped to enter and fill said annular grooves and the other side flat, and a container for said glass and its gaskets having flat contact surfaces adjacent to the flat sides of the gaskets.

In testimony whereof I have hereunto set my hand this 21st day of August A. D. 1908.

FRANK W. EDWARDS.

Witnesses:
WILLIAM S. FURRY,
GEORGE M. DICKSON.

Correction in Letters Patent No. 952,515.

It is hereby certified that in Letters Patent No. 952,515, granted March 22, 1910, upon the application of Frank W. Edwards, of Logansport, Indiana, for an improvement in "Sight-Feed for Lubricators," an error appears in the printed specification requiring correction as follows: Page 1, line 96, the number "460,096" should read *450,096;* and that the said Letters Patent should be read with this correction therein that the same may conform to the record of the case in the Patent Office.

Signed and sealed this 19th day of April, A. D., 1910.

[SEAL.]

C. C. BILLINGS,

*Acting Commissioner of Patents.*